United States Patent
Ylinen (10) Patent No.: US 12,236,272 B2
(45) Date of Patent: Feb. 25, 2025

(54) COMPUTING SYSTEM RESOURCE USAGE ACCOUNTING AND USAGE LIMIT ENFORCEMENT

(71) Applicant: Intel Corporation, Santa Clara, CA (US)

(72) Inventor: Mikko Ylinen, Lempäälä (FI)

(73) Assignee: Intel Corporation, Santa Clara, CA (US)

( * ) Notice: Subject to any disclaimer, the term of this patent is extended or adjusted under 35 U.S.C. 154(b) by 451 days.

(21) Appl. No.: 17/524,055

(22) Filed: Nov. 11, 2021

(65) Prior Publication Data

US 2022/0083383 A1 Mar. 17, 2022

Related U.S. Application Data

(60) Provisional application No. 63/135,528, filed on Jan. 8, 2021.

(51) Int. Cl.
*G06F 9/46* (2006.01)
*G06F 9/50* (2006.01)

(52) U.S. Cl.
CPC .................. *G06F 9/5027* (2013.01)

(58) Field of Classification Search
CPC ..................................................... G06F 9/5027
USPC ......................................................... 718/104
See application file for complete search history.

(56) References Cited

U.S. PATENT DOCUMENTS

| | | | | |
|---|---|---|---|---|
| 7,665,090 B1* | 2/2010 | Tormasov | ............. | G06F 9/4881 |
| | | | | 718/104 |
| 8,606,920 B1* | 12/2013 | Gupta | ................... | G06F 9/5011 |
| | | | | 709/226 |
| 11,206,181 B1* | 12/2021 | Goodell | ................ | G06F 9/5011 |
| 2017/0185776 A1* | 6/2017 | Robinson | .............. | G06F 21/575 |
| 2017/0351441 A1* | 12/2017 | Marinescu | ............ | G06F 3/0619 |
| 2018/0027062 A1* | 1/2018 | Bernat | ................ | G06F 13/4022 |
| 2018/0309686 A1* | 10/2018 | Roth | ........................ | H04L 47/25 |
| 2020/0322226 A1* | 10/2020 | Mishra | .................. | H04L 43/067 |
| 2020/0379803 A1* | 12/2020 | Saillet | .................... | G06F 9/4887 |
| 2021/0160192 A1* | 5/2021 | Jain | ......................... | H04L 47/80 |
| 2022/0083383 A1* | 3/2022 | Ylinen | .................. | G06F 9/4843 |

OTHER PUBLICATIONS

Bernal, Mauricio Vasquez; "Extending systemd Security Features with eBPF," retrieved from the Internet at https://kinvolk.io/blog/2021/04/extending-systemd-security-features-with-ebpf/ ; Apr. 9, 2021; 11 pages.

* cited by examiner

*Primary Examiner* — Mehran Kamran
(74) *Attorney, Agent, or Firm* — Alliance IP, LLC (57) ABSTRACT

Resource access control modules that are part of an operating system kernel and data structures visible in both user space and kernel space provide for user space-based configuration of computing system resource limits, accounting of resource usage, and enforcement of resource usage limits. Computing system resource limits can be set on an application, customer, or other basis, and usage limits can be placed on various system resources, such as files, ports, I/O devices, memory, and processing unit bandwidth. Resource usage accounting and resource limit enforcement can be implemented without the use of in-kernel control groups. The resource access control modules can be extended Berkeley Program Format (eBPF) Linux Security Module (LSM) programs linked to LSM hooks in the Linux operation system kernel.

25 Claims, 6 Drawing Sheets

FIG. 1

```
SEC("lsm/file_ioctl")
int BPF_PROG(test_sgx_max_enclave_size_hook, struct file *file, unsigned int cmd,
      unsigned long arg, int ret)

{
      if (ret != 0)
            return ret;

if (cmd == SGX_IOC_ENCLAVE_CREATE) {
            struct sgx_enclave_create ec;
            int err:

err = bpf_probe_read_user(&ec, sizeof(struct sgx_enclave_create), (void *)arg);
            if (err)
                  return -EFAULT;

unsigned int zero = 0;

struct sgx_secs* secs = bpf_map_lookup_elem(&cpu_sgx_secs, &zero);
            if (!secs)
                  return -EFAULT;

bpf_probe_read_user(secs, sizeof(struct sgx_secs), (void *)ec.src);
            /*
             *(pseudo code)
             *
             * current_container = bpf_get_current_cgroup_id();
             *
             * container_epc_usage = bpf map_lookup_elem(&epc_usages_map, &current_container);
             *
             * container_epc_limit = bpf map_lookup_elem(&epc_limits_map, &current_container);
             *
             * if (container_epc_usage + secs->size > container_epc_limit)
             *     return -EPERM
             */
            if (secs->size > 10) {
                  enclave_size = secs->size;
                  return -EPERM;
            }
      }
      return ret;
}
```

RECEIVE REQUEST FOR A REQUESTED AMOUNT OF A RESOURCE OF A
COMPUTING SYSTEM
310

DENY REQUEST IF GRANTING REQUEST WOULD EXCEED RESOURCE LIMIT
320

WRITE TO DATA STRUCTURE VISIBLE TO USER SPACE AND KERNEL SPACE OF INFORMATION INDICATING A RESOURCE LIMIT INDICATING A LIMIT ON AN AMOUNT OF A RESOURCE OF THE COMPUTING DEVICE THAT CAN BE UTILIZED BY AN APPLICATION
410

PROVIDE TO OPERATING SYSTEM A REQUEST FOR AN AMOUNT OF THE RESOURCE
420

RECEIVE FROM THE OPERATING SYSTEM INFORMATION INDICATING WHETHER THE RESOURCE REQUEST IS TO BE GRANTED OR DENIED
430

COMPUTING SYSTEM RESOURCE USAGE ACCOUNTING AND USAGE LIMIT ENFORCEMENT

BACKGROUND

The Linux operating system cgroups kernel feature provides for the accounting of computing system resource usage by processes executing on the computing system and enforces limits on computing system resource usage by the processes.

Linux Security Modules (LSM) is a framework within the Linux kernel in which calls (hooks) to access control modules are placed in the kernel to control access to a kernel object before a user-level system call results in access to the kernel object. Extended Berkeley Program Format (eBPF) programs can be linked to LSM hooks to allow for runtime instrumentation of LSM hooks.

DETAILED DESCRIPTION

The technologies disclosed herein utilize resource access control modules linked to hooks in an operating system kernel and data structures visible in both user and kernel spaces to provide for user space-based configuration of computing system resource limits, accounting of resource usage, and enforcement of resource usage limits. Limits of the use of a computing system resource limits can be set on an application, customer, or another basis, and limits can be placed on the usage of a various system resources (e.g., memory, processing unit bandwidth). Resource usage accounting and resource limit enforcement are implemented without the use of in-kernel control groups, such as the Linux operation system cgroups kernel feature. In Linux operating system embodiments, the resource access control modules are extended Berkeley Packet Format (eBPF) Linux Security Module (LSM) programs linked to LSM hooks and the data structures with user and kernel space visibility are eBPF maps. An eBPF LSM program can be invoked by the Linux kernel when an application makes a system call that involves a resource request. The invoked resource access module decides whether the request should be granted or denied by referencing an eBPF map to see if the request is allowable given current resource usage and resource usage limits.

Linux's cgroups (control groups) kernel feature is an existing operating system resource access control approach. The Linux cgroup feature accounts for and isolates computing system resource usage for processes executing on the computing system. One disadvantage of Linux cgroup controllers is that new cgroup controllers can be subjected to a lengthy review process before being accepted for inclusion in the Linux kernel. Further, once accepted, it can take time before a new cgroup controller is widely adopted. For example, cgroups are commonly used in container environments to set central processing unit (CPU) and memory usage constraints and it can take time before a new cgroup controller is widely adopted by container runtimes and orchestrators. Such delays in the introduction and adoption of a new cgroup controller can delay the adoption of new hardware features. For example, the lack of resource usage accounting and resource limit enforcement may render a new hardware feature unsafe or liable to impact system or application quality of service in multi-tenant environments.

Utilizing the technologies disclosed herein, customizable computing system resource limit enforcement can be implemented without ecosystem adoption. The technologies disclosed herein can be applied in cloud environments. For example, Cloud Service Providers (CSPs) may desire to enforce computing system resource limits in their cloud deployments to ensure that multiple tenants running applications simultaneously do not try to use more system resources than are available. In addition to setting computing system resource limits on an application basis, CSPs can set resource limits on a customer basis as well. For example, a CSP may limit the amount of a computing system resource that an application associated with a particular customer can utilize. In some cloud-based embodiments, the technologies disclosed herein can be used by container orchestration systems, such as Kubernetes.

The computing system resource accounting and limits enforcement technologies disclosed herein have at least the following advantages. They allow for the introduction of an approach for the accounting of computing system resources and the enforcement of resource usage limits independent from the operating system kernel development cycle, operating system release schedules, and ecosystem adoption. This can result in earlier adoption of new hardware features, such as new processor features, that depend on accurate resource accounting and resource limits enforcement.

In the following description, specific details are set forth, but embodiments of the technologies described herein may be practiced without these specific details. Well-known circuits, structures, and techniques have not been shown in detail to avoid obscuring an understanding of this description. "An embodiment," "various embodiments," "some embodiments," and the like may include features, structures, or characteristics, but not every embodiment necessarily includes the particular features, structures, or characteristics.

The description may use the phrases "in an embodiment," "in embodiments," "in some embodiments," and/or "in various embodiments," each of which may refer to one or more of the same or different embodiments. Furthermore, the terms "comprising," "including," "having," and the like, as used with respect to embodiments of the present disclosure, are synonymous.

As used herein, the terms "operating", "executing", or "running" as they pertain to software or firmware in relation to a system, device, platform, or resource are used interchangeably and can refer to software or firmware stored in one or more computer-readable storage media accessible by the system, device, platform or resource, even though the software or firmware instructions are not actively being executed by the system, device, platform, or resource.

Software and firmware may be embodied as instructions and/or data stored on non-transitory computer-readable storage media.

Reference is now made to the drawings, which are not necessarily drawn to scale, wherein similar or same numbers may be used to designate same or similar parts in different figures. The use of similar or same numbers in different figures does not mean all figures including similar or same numbers constitute a single or same embodiment. Like numerals having different letter suffixes may represent different instances of similar components. The drawings illustrate generally, by way of example, but not by way of limitation, various embodiments discussed in the present document.

In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives within the scope of the examples.

Figure 1:
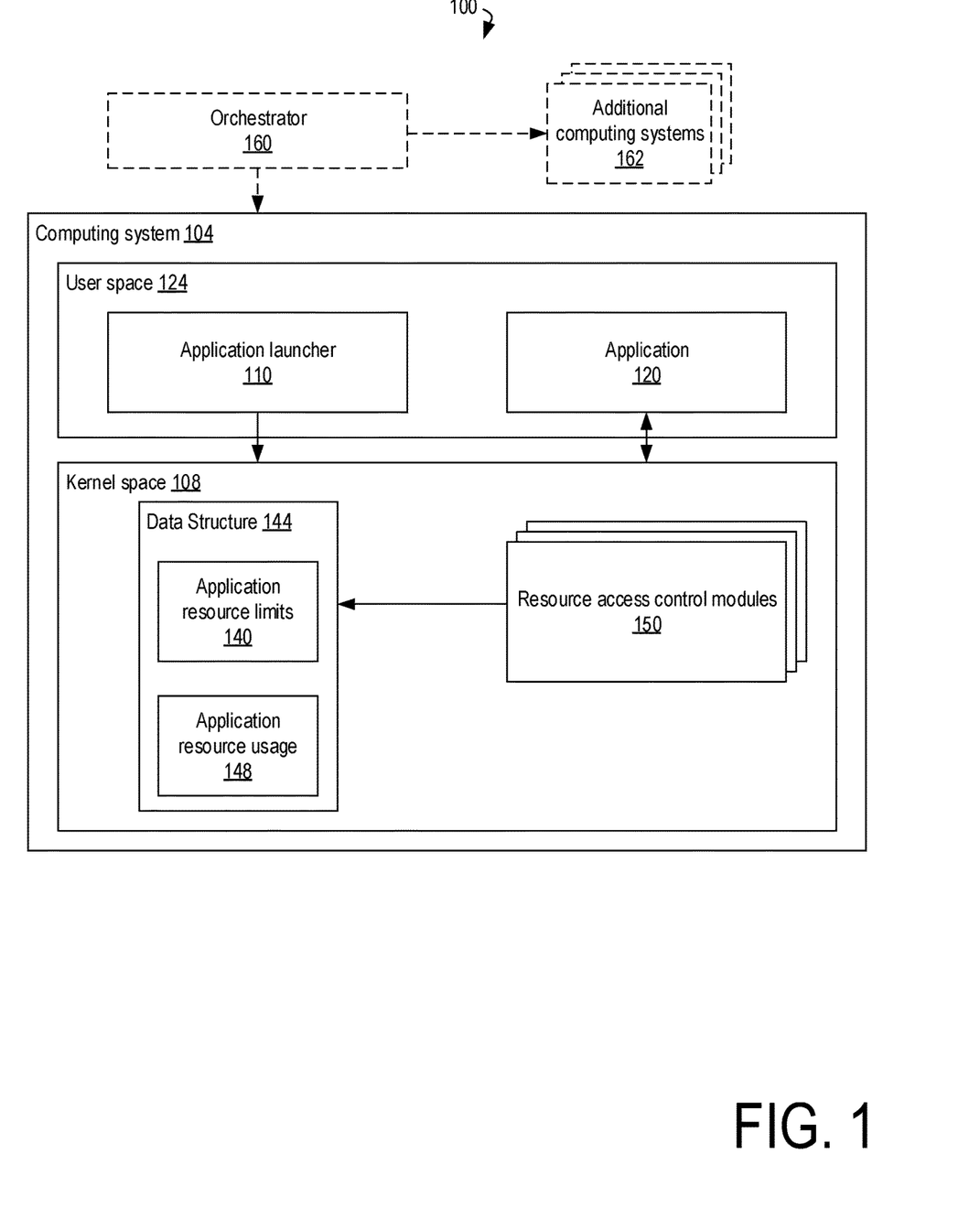
FIG. 1 illustrates an example environment for the accounting of computing system resource usage and enforcement of resource usage limits.

FIG. 1 illustrates an example environment for the accounting of computing system resource usage and enforcement of resource usage limits. The environment 100 comprises a computing system 104 executing an operating system. The computing system 104 can be any computing system described or referenced herein, such as a server system. The environment 100 further comprises an application launcher 110 that launches an application 120, the application launcher and the application residing in user space 124. The application launcher 110 launches the application 120 by submitting an application launch request to the operating system. Launching the application 120 can comprise the application launcher 110 submitting application resource limits 140 to the operating system that specify computing system resources to be used by the application 120 and limits on the usage of the individual resources by the application 120. In some embodiments, the application resource limits 140 can comprise an amount of an individual resource that the application 120 needs to begin execution. The application resource limits 140 can be sent to the operating system as part of an application manifest. The application resource limits 140 are stored in a data structure 144 that is accessible to software or firmware entities (e.g., applications, programs, modules) that reside in user space 124 or kernel space 108, even though the data structure 144 is illustrated as residing in the kernel space 108. In some embodiments, the application resource limits 140 comprise application identifier-resource limit key-value pairs, with the application identifier key used as an index for the data structure 144. In addition to storing application resource limits 140, the data structure 144 can store the amount of computing system resources being utilized by an application (e.g., application resource usage 148).

Resource limits are enforced by resource access control modules 150 that are called by an operating system in response to the operating system receiving a resource request from the application 120. The resource request provided by the application 120 can be made in the form of a system call. A resource request can comprise, for example, access to a resource (e.g., file, I/O device, port) or a requested amount of a resource (e.g., an amount of memory, storage, or processing unit bandwidth). In some embodiments, the resource access control modules 150 can be called via hooks that are placed in the kernel where a system call by an application is to result in access to computing system resources. The resource access control modules 150 can be customized for a specific use-case or customer. For example, if a CSP desires to limit the use of a particular system resource for a particular customer, the CSP can deploy a resource access control module 150 that enforces usage limits for that particular resource if a resource request is made by an application associated with an application identifier that is associated with the particular customer. In some embodiments, to save processing time, a resource access control module 150 is called only if the application identifier meets specified criteria.

In some embodiments where a Linux operating system is operating on the computing system 104, the resource access control modules 150 can be eBPF LSM programs linked to LSM hooks. New or updated eBPF LSM programs can be installed at a computing system 104 by linking the new or updated eBPF LSM program to an LSM hook.

A resource access control module 150 determines whether a resource request can be granted by accessing the data structure 144 using the application identifier submitted to the operating system as part of the resource request as a key to look up the resource usage limit for the requesting application for the requested resource. The application identifier can be provided to the resource access control module 150 by the operating system. In the case of the resource request comprising a requested amount of a resource to be allocated, the resource access control module 150 then determines whether granting the resource request, taking into current resource usage levels and the requested amount, would cause the resource limit associated with the requested resource and the requesting application to be exceeded. If not, the called resource access control module 150 returns information indicating that the resource request can be granted. If granting the resource request would exceed the resource limit associated with the requested computing system resource and the requesting application, the called resource access control module 150 returns information indicating that the resource request is to be denied.

In the case of the resource request comprising access to a resource, the resource access control module 150 then determines whether access to the resource is to be granted based on the resource limit (which can be information indicating whether the requesting application is to have access to the requested resource). If the resource limit indicates that the requesting application is to have access to the requested resource, the resource access control module 150 returns information indicating that the resource request is to be granted. If not, the resource access control module returns information indicating that the resource request is to be denied. The called resource access control module 150 can indicate the grant or denial of a resource request through, for example, return codes.

If the resource access control module 150 determines that a resource request can be granted, the resource access control module 150 updates the application resource usage 148 in the data structure 144. Although the resource access control modules 150 are illustrated in FIG. 1 as residing in the kernel space 108, in some embodiments, they can reside in the user space 124.

In some embodiments, the environment 100 comprises an orchestrator 160, such as a container orchestrator or a virtualization orchestrator that configures containers or virtual machines for deployment to a set of computing systems, such as the computing system 104 and additional computing systems 162, and manages the deployed containers or virtual machines.

Further discussion of the operation of the environment 100 is provided in the context of enforcing limits on how much Intel® Software Guard Extension (SGX) Encrypted Page Cache (EPC) memory a container operating on a computing system running a Linux operating system can utilize. Thus, in this example, the application launcher 110 is a container runtime, the application 120 is a container, the kernel space 108 is a Linux kernel space, the data structure 144 is an eBPF map, and the resource access control modules 150 are eBPF LSM programs that are linked to LSM hooks to the Linux kernel.

The container can be provided by the orchestrator 160, and the orchestrator 160 can configure resource limits for the container to be enforced by one or more eBPF LSM programs. The orchestrator 160 can configure these resource limits based on various factors, such as the customer associated with the container, the amount of resources available on the computing system 104, containers currently running on the computing system 104, and containers scheduled to run on the computing system 104. The orchestrator can also deploy the eBPF LSM programs to the computing system.

As part of launching the container, the container runtime sends an application manifest to the operating system indicating which computing system resources and how much of the individual resources the container needs to begin execution. The container runtime also sets limits on how much of the individual resources that the container can use by writing the limits to an eBPF map and associates these resource limits in the eBPF map with an application identifier associated with the container. In the example, the application manifest specifies the amount of SGX EPC memory needed by the container to begin execution and a limit on the amount of SGX EPC memory that the container can use. The initial amount of SGX EPC memory allocated to the container is written to the eBPF map to reflect the container's initial usage of this resource. The limit on the amount of SGX EPC memory that the container can use is written to the eBPF map as well.

After the container runtime starts the container, the container initializes itself and allocates necessary resources. To create an SGX enclave and to add memory pages to the enclave, the container makes ioctl (input/output control) system calls to the Linux operating system, with the container's application identifier as an ioctl system call input parameter. An ioctl call comprising information indicating an allocation request for SGX EPC memory results in an LSM hook calling an eBPF LSM program responsible for determining whether an SGX EPC resource request can be granted. The called eBPF LSM program references the eBPF map to access the SGX EPC memory page usage limit and current usage for the container. The eBPF LSM program determines whether the SGX EPC memory allocation request can be granted based on the resource limit and current usage and provides a return code to the Linux kernel indicating whether the SGX EPC memory allocation request is granted or denied. If the resource request is to be granted, the eBPF LSM program updates the data structure 144 to reflect SGX EPC memory usage by the container accounting for the granted request.

The accounting of resource usage and the enforcement of resource usage limits for computing system resources other than SGX EPC memory (e.g., processing unit bandwidth) can be similarly implemented. That is, the accounting and enforcement can be implemented by eBPF LSM programs linked to LSM hooks in the Linux kernel, the eBPF LSM programs invoked in response to resource requests by an application in user space and checking whether the resource request is allowable given the current usage of the resource by the application and limits on the requested resource by the application specified in an eBPF map.

Further, the technologies disclosed herein are not limited to limiting the resource usage of containers. The user space components (e.g., application launcher 110, application 120) could be implemented in various other ways, including non-container implementations. For example, the application launcher 110 could be a hypervisor operating on an operating system of the computing system (a type-2 hypervisor) and the application 120 could be a virtual machine being executed by the hypervisor.

The accounting of SGX memory usage and enforcement of SGX memory usage limits is relevant as confidential computing based on SGX has been adopted by various CSPs. The disclosed technologies can be used for the accounting of SGX usage and enforcement limits of SGX usage without a Linux SGX EPC cgroups controller, which can accelerate the adoption of confidential computing in multi-tenant environments.

Figure 2:
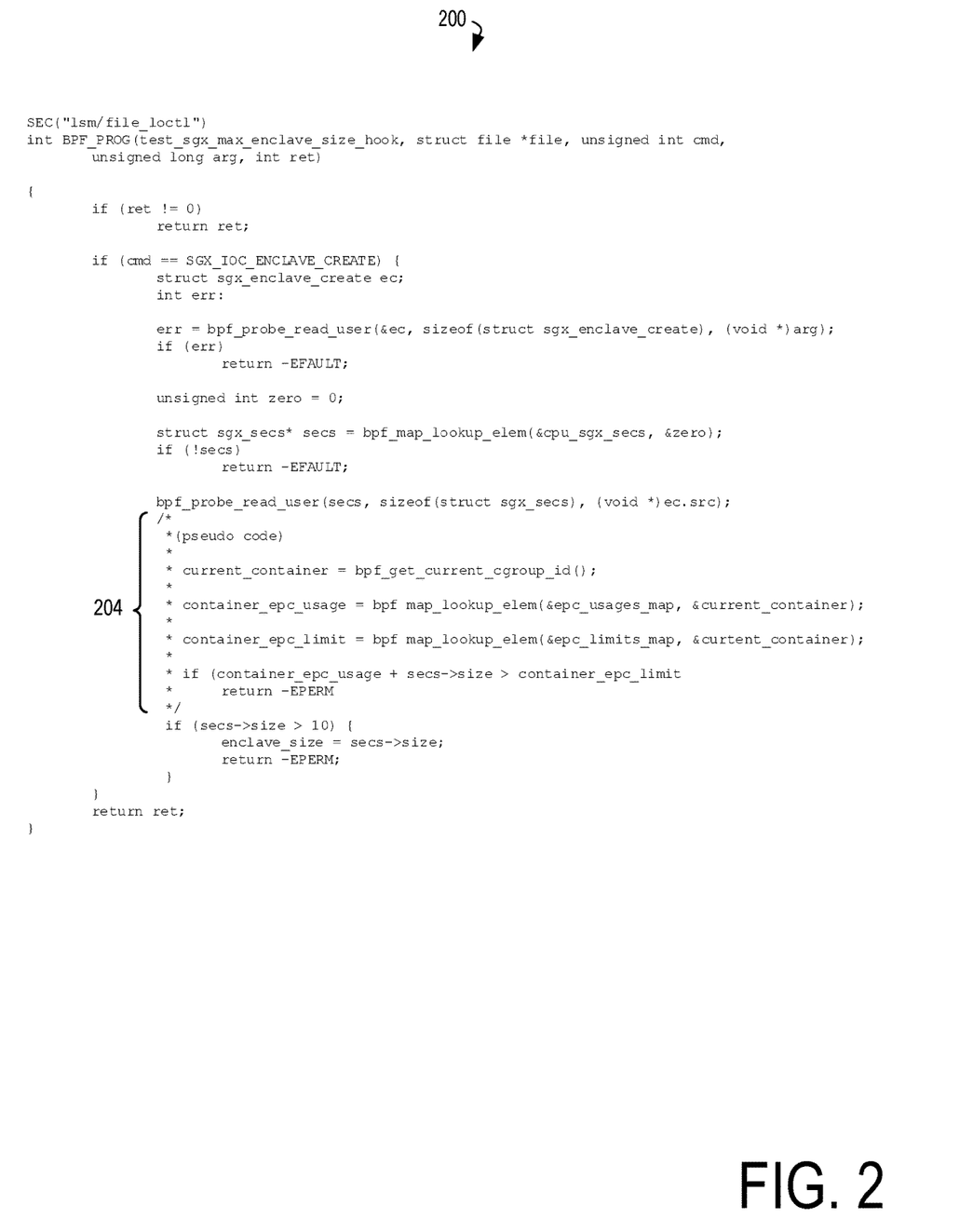
FIG. 2 illustrates example code and pseudocode implementing an example eBPF LSM program.

FIG. 2 illustrates example code and pseudocode implementing an example eBPF LSM program. The eBPF LSM program 200 (which contains pseudocode 204), is linked to a file ioctl LSM hook that denies a SGX enclave creation request made by an application via an ioctl call if the SGX EPC limit for the given application has been exceeded. Such an eBPF LSM program can replace a Linux SGX EPC cgroups controller.

Figure 3:
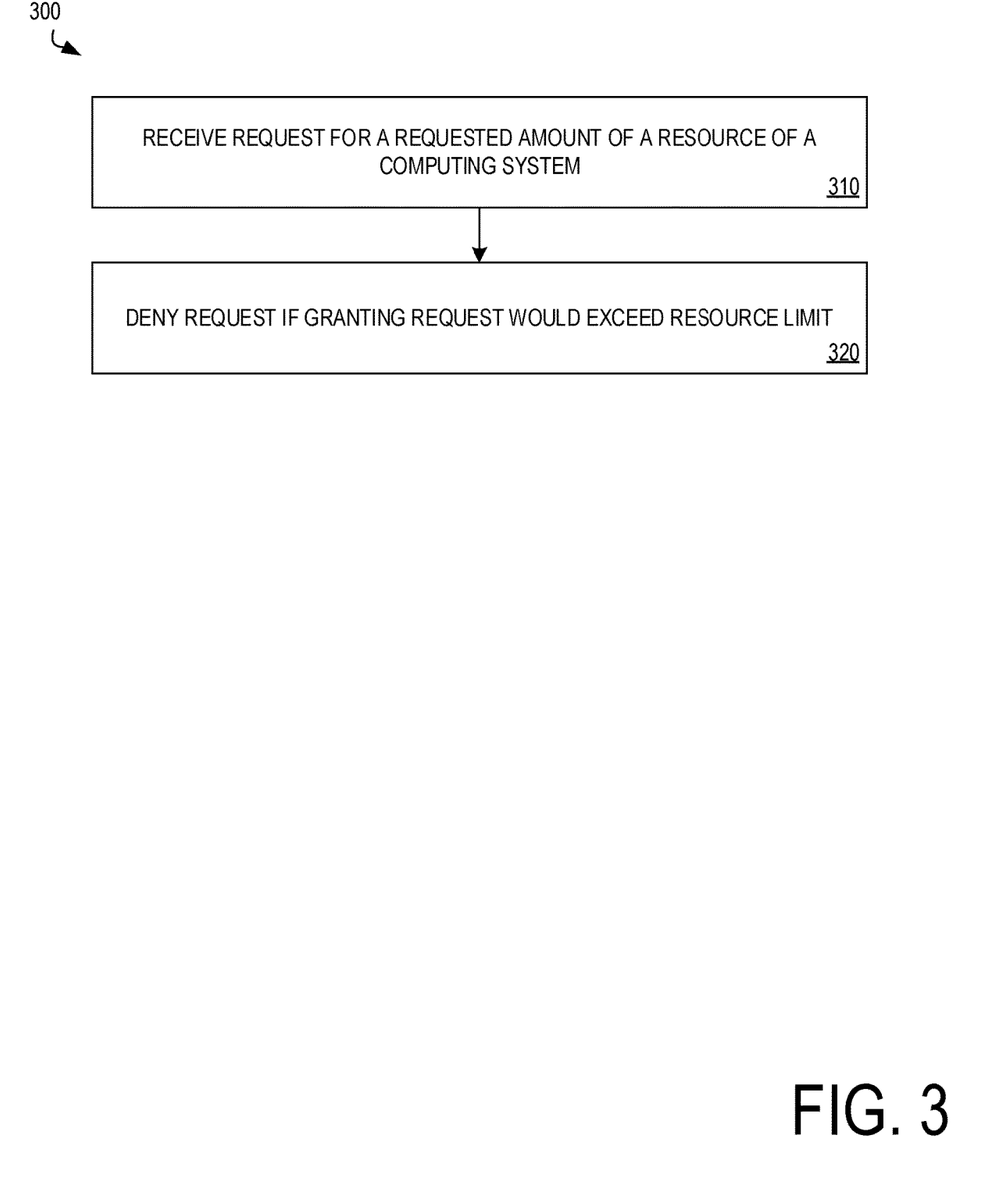
FIG. 3 is an example method of enforcing a computing system resource limit.

FIG. 3 is an example method of enforcing a computing system resource limit. The method 300 can be performed by, for example, an operating system of a server. At 310, an operating system receives a request from an application for a requested amount of a resource of a computing system, the operating system and the application operating on the computing system. At 320, the request is denied if granting the request would exceed a resource limit indicating a limit on an amount of the resource that can be utilized by the application, the denying comprising accessing a data structure storing information indicating the resource limit, the data structure visible to a user space and a kernel space of computing system.

In other embodiments, the method 300 can comprise additional elements. For example, the method 300 can further comprise calling a resource access control module to determine whether granting the request would exceed the resource limit. In another example, the method 300 can further comprise granting, by the resource access control module, the request if granting the request would not exceed the resource limit, the granting the request based on the current usage of the resource.

Figure 4:
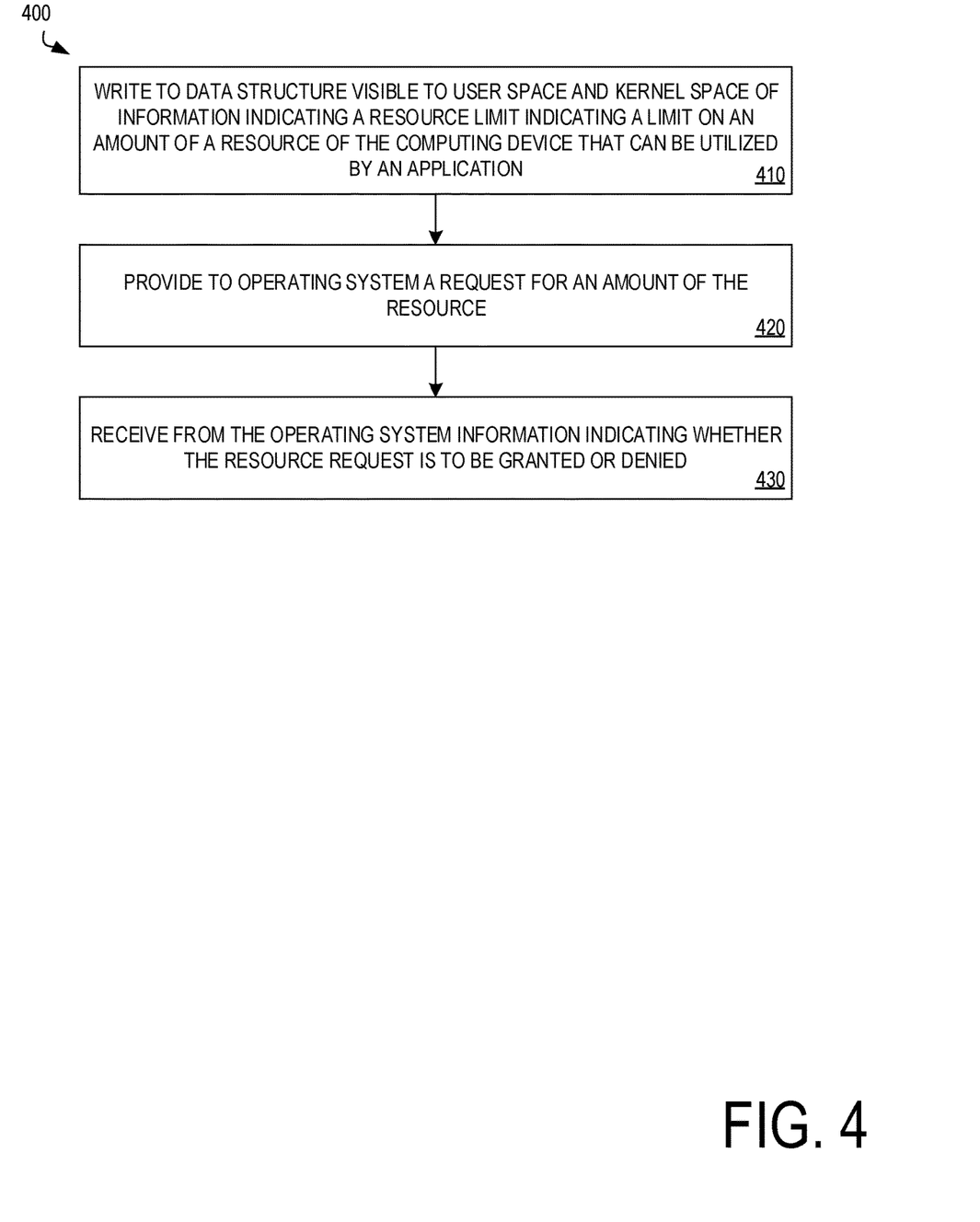
FIG. 4 is an example method of requesting an amount of a computing system resource.

FIG. 4 is an example method of requesting an amount of a computing system resource. The method 400 can be performed by, for example, an application executing on a server. At 410, information indicating a resource limit indicating a limit on an amount of a resource of the computing system that can be utilized by an application executing on the computing system is written to a data structure visible to a user space and a kernel space of a computing system. At 420, a request for an amount of the resource is provided from the application to an operating system executing on the computing system. At 430, information indicating whether the resource request is to be granted or denied is received from the operating system.

The technologies, techniques and embodiments described herein can be performed by or implemented in any of a variety of computing systems, such as laptop computers, (e.g., 2-in-1 laptops, convertible laptops), desktop computers, servers, workstations, gaming consoles, and rack-level computing solutions (e.g., blades, trays, sleds). As used herein, the term "computing system" includes computing devices and includes systems comprising multiple discrete physical components. In some embodiments, the computing system is located in a data center, such as an enterprise data center (e.g., a data center owned and operated by a company and typically located on company premises), managed services data center (e.g., a data center managed by a third party on behalf of a company), a colocated data center (e.g., a data center in which data center infrastructure is provided by the data center host and a company provides and manages their own data center components (servers, etc.)), cloud data center (e.g., a data center operated by a cloud services provider that host companies applications and data), or an edge data center (e.g., a data center that typically has a smaller footprint than other data center types and is located close to the geographic area that it serves).

Figure 5:
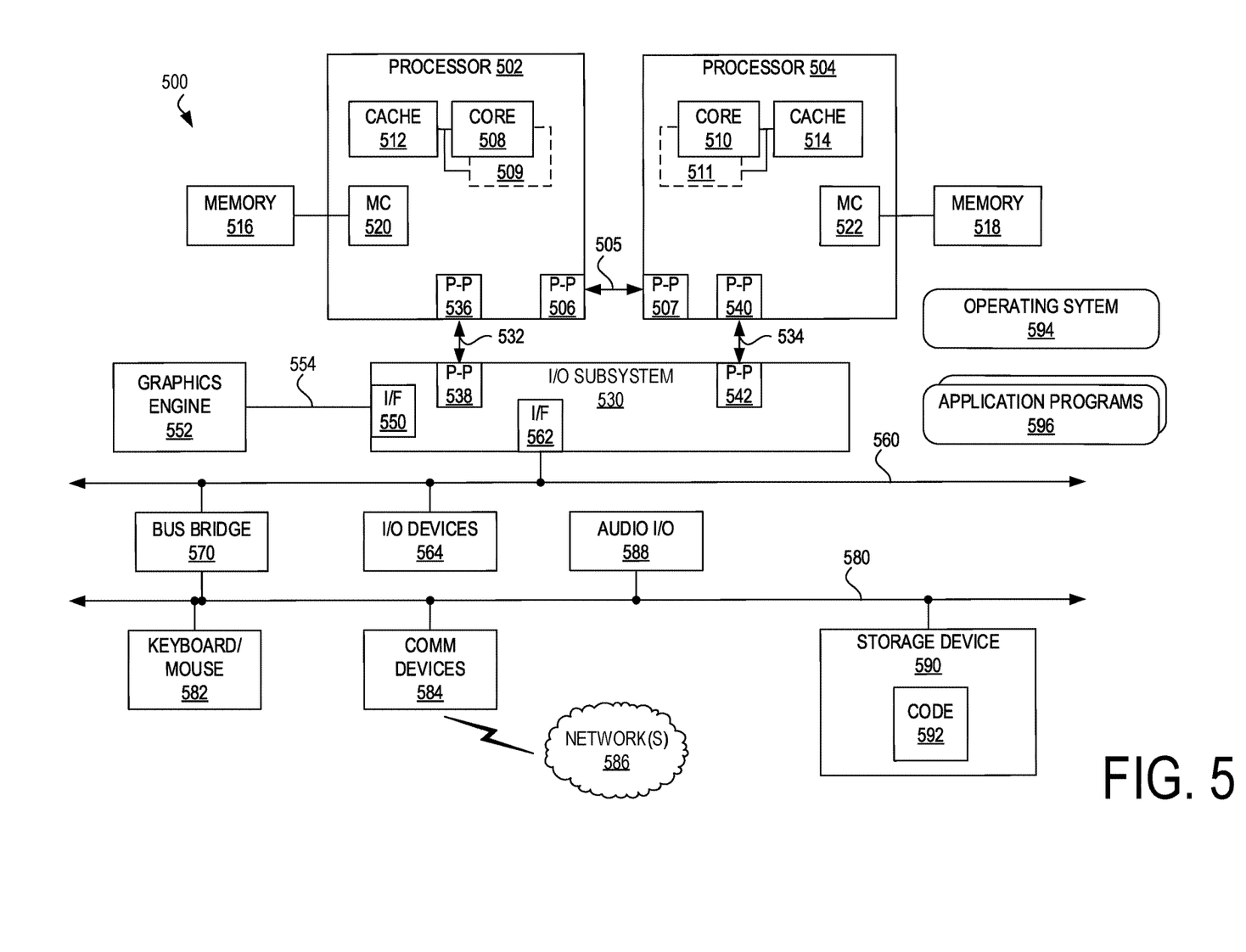
FIG. 5 is a block diagram of an exemplary computing system in which technologies described herein may be implemented.

FIG. 5 is a block diagram of an exemplary computing system in which technologies described herein may be implemented. Generally, components shown in FIG. 5 can communicate with other shown components, although not all connections are shown, for ease of illustration. The system 500 is a multiprocessor system comprising a first processor unit 502 and a second processor unit 504 and is illustrated as comprising point-to-point (P-P) interconnects. For example, a point-to-point (P-P) interface 506 of the processor unit 502 is coupled to a point-to-point interface 507 of the processor unit 504 via a point-to-point interconnection 505. It is to be understood that any or all of the point-to-point interconnects illustrated in FIG. 5 can be alternatively implemented as a multi-drop bus, and that any or all buses illustrated in FIG. 5 could be replaced by point-to-point interconnects.

As shown in FIG. 5, the processor units 502 and 504 are multicore processors. Processor unit 502 comprises processor cores 508 and 509, and processor unit 504 comprises processor cores 510 and 511. Processor cores 508-511 can execute computer-executable instructions in a manner similar to that discussed below in connection with FIG. 6, or in other manners.

Processor units 502 and 504 further comprise at least one shared cache memory 512 and 514, respectively. The shared caches 512 and 514 can store data (e.g., instructions) utilized by one or more components of the processor, such as the processor cores 508-509 and 510-511. The shared caches 512 and 514 can be part of a memory hierarchy for the system 500. For example, the shared cache 512 can locally store data that is also stored in a memory 516 to allow for faster access to the data by components of the processor 502. In some embodiments, the shared caches 512 and 514 can comprise multiple cache layers, such as level 1 (L1), level 2 (L2), level 3 (L3), level 5 (L4), and/or other caches or cache layers, such as a last level cache (LLC).

Although the system 500 is shown with two processor units, the system 500 can comprise any number of processor units. Further, a processor unit can comprise any number of processor cores. A processor unit can take various forms such as a central processing unit, a controller, a graphics processor, an accelerator (such as a graphics accelerator, digital signal processor (DSP), or AI accelerator)). In some embodiments, the system 500 or an integrated circuit package can comprise one or more processor units that are heterogeneous or asymmetric to a first processor, accelerator, FPGA, or any other processor unit. There can be a variety of differences between the processing units in a system in terms of a spectrum of metrics of merit including architectural, microarchitectural, thermal, power consumption characteristics and the like. These differences can effectively manifest themselves as asymmetry and heterogeneity amongst the processor units in a system. In some embodiments, the processor units 502 and 504 reside in the same integrated circuit package. As used herein, the terms "processor unit" and "processing unit" can refer to any processor, processor core, component, module, engine, circuitry or any other processing element described herein.

Processor units 502 and 504 further comprise memory controller logic (MC) 520 and 522. As shown in FIG. 5, MCs 520 and 522 control memories 516 and 518 coupled to the processor units 502 and 504, respectively. The memories 516 and 518 can comprise various types of memories, such as volatile memory (e.g., dynamic random-access memories (DRAM), static random-access memory (SRAM)) or non-volatile memory (e.g., flash memory, solid-state drives, chalcogenide-based phase-change non-volatile memories). While MCs 520 and 522 are illustrated as being integrated into the processor units 502 and 504, in alternative embodiments, the MCs can be logic external to a processor unit, and can comprise one or more layers of a memory hierarchy.

Processor units 502 and 504 are coupled to an Input/Output (I/O) subsystem 530 via point-to-point interconnections 532 and 534. The point-to-point interconnection 532 connects a point-to-point interface 536 of the processor unit 502 with a point-to-point interface 538 of the I/O subsystem 530, and the point-to-point interconnection 534 connects a point-to-point interface 540 of the processor unit 504 with a point-to-point interface 542 of the I/O subsystem 530. Input/Output subsystem 530 further includes an interface 550 to couple I/O subsystem 530 to a graphics engine 552, which can be a high-performance graphics engine. The I/O subsystem 530 and the graphics engine 552 are coupled via a bus 554. Alternately, the bus 554 could be a point-to-point interconnection.

Input/Output subsystem 530 is further coupled to a first bus 560 via an interface 562. The first bus 560 can be a Peripheral Component Interconnect (PCI) bus, a PCI Express bus, or any other type of bus.

Various I/O devices 564 can be coupled to the first bus 560. A bus bridge 570 can couple the first bus 560 to a second bus 580. In some embodiments, the second bus 580 can be a low pin count (LPC) bus. Various devices can be coupled to the second bus 580 including, for example, a keyboard/mouse 582, audio I/O devices 588 and a storage device 590, such as a hard disk drive, solid-state drive or other storage device for storing computer-executable instructions (code) 592. The code 592 can comprise computer-executable instructions for performing technologies described herein. Additional components that can be coupled to the second bus 580 include communication device(s) 584, which can provide for communication between the system 500 and one or more wired or wireless networks 586 (e.g. Wi-Fi, cellular or satellite networks) via one or more wired or wireless communication links (e.g., wire, cable, Ethernet connection, radio-frequency (RF) channel, infrared channel, Wi-Fi channel) using one or more communication standards (e.g., IEEE 502.11 standard and its supplements).

The system 500 can comprise removable memory such as flash memory cards (e.g., SD (Secure Digital) cards), memory sticks, Subscriber Identity Module (SIM) cards). The memory in system 500 (including caches 512 and 514, memories 516 and 518 and storage device 590) can store data and/or computer-executable instructions for executing an operating system 594 and application programs 596.

Example data includes web pages, text messages, images, sound files and video data to be sent to and/or received from one or more network servers or other devices by the system 500 via one or more wired or wireless networks, or for use by the system 500. The system 500 can also have access to external memory (not shown) such as external hard drives or cloud-based storage.

The operating system 594 can control the allocation and usage of the components illustrated in FIG. 5 and support one or more application programs 596. The application programs 596 can include common mobile computing device applications (e.g., email applications, calendars, contact managers, web browsers, messaging applications) as well as other computing applications.

In some embodiments, a hypervisor (or virtual machine manager) operates on the operating system 594 and the application programs 596 operate within one or more virtual machines operating on the hypervisor. In these embodiments, the hypervisor is a type-2 or hosted hypervisor as it is running on the operating system 594. In other hypervisor-based embodiments, the hypervisor is a type-1 or "bare-metal" hypervisor that runs directly on the platform resources of the computing system 594 without an intervening operating system layer.

In some embodiments, the applications 596 can operate within one or more containers. A container is a running instance of a container image, which is a package of binary images for one or more of the applications 596 and any libraries, configuration settings, and any other information that one or more applications 596 need for execution. A container image can conform to any container image format, such as Docker®, Appc, or LXC container image formats. In container-based embodiments, a container runtime engine, such as Docker Engine, LXU, or an open container initiative (OCI)-compatible container runtime (e.g., Railcar, CRI-O) operates on the operating system (or virtual machine monitor) to provide an interface between the containers and the operating system 594. An orchestrator can be responsible for management of the computing system 500 and various container-related tasks such as deploying container images to the computing system 594, monitoring the performance of deployed containers, and monitoring the utilization of the resources of the computing system 594.

The system 500 can support various input devices, such as a touchscreen, microphone, camera, trackball, touchpad, trackpad, mouse, keyboard, proximity sensor, light sensor, electrocardiogram (ECG) sensor, PPG (photoplethysmogram) sensor, galvanic skin response sensor, and one or more output devices, such as one or more speakers or displays. Other possible input and output devices include piezoelectric and other haptic I/O devices. Any of the input or output devices can be internal to, external to or removably attachable with the system 500. External input and output devices can communicate with the system 500 via wired or wireless connections.

In addition, the computing system 500 can provide one or more natural user interfaces (NUIs). For example, the operating system 594 or applications 596 can comprise speech recognition logic as part of a voice user interface that allows a user to operate the system 500 via voice commands. Further, the system 500 can comprise input devices and logic that allows a user to interact with the system 500 via a body, hand or face gestures.

The system 500 can further comprise one or more communication components 584. The components 584 can comprise wireless communication components coupled to one or more antennas to support communication between the system 500 and external devices. The wireless communication components can support various wireless communication protocols and technologies such as Near Field Communication (NFC), IEEE 1002.11 (Wi-Fi) variants, WiMax, Bluetooth, Zigbee, 5G Long Term Evolution (LTE), Code Division Multiplexing Access (CDMA), Universal Mobile Telecommunication System (UMTS) and Global System for Mobile Telecommunication (GSM). In addition, the wireless modems can support communication with one or more cellular networks for data and voice communications within a single cellular network, between cellular networks, or between the mobile computing device and a public switched telephone network (PSTN).

The system 500 can further include at least one input/output port (which can be, for example, a USB, IEEE 1394 (FireWire), Ethernet and/or RS-232 port) comprising physical connectors and a power supply (such as a rechargeable battery). The system 500 can further include one or more additional antennas coupled to receivers, transmitters and/or transceivers.

It is to be understood that FIG. 5 illustrates only one exemplary computing system architecture. Computing systems based on alternative architectures can be used to implement technologies described herein. For example, instead of the processors 502 and 504, and the graphics engine 552 being located on discrete integrated circuits, a computing device can comprise a SoC (system-on-a-chip) integrated circuit incorporating multiple processors, a graphics engine and additional components. Further, a computing device can connect elements via bus or point-to-point configurations different from that shown in FIG. 5. Moreover, the illustrated components in FIG. 5 are not required or all-inclusive, as shown components can be removed and other components added in alternative embodiments.

Figure 6:
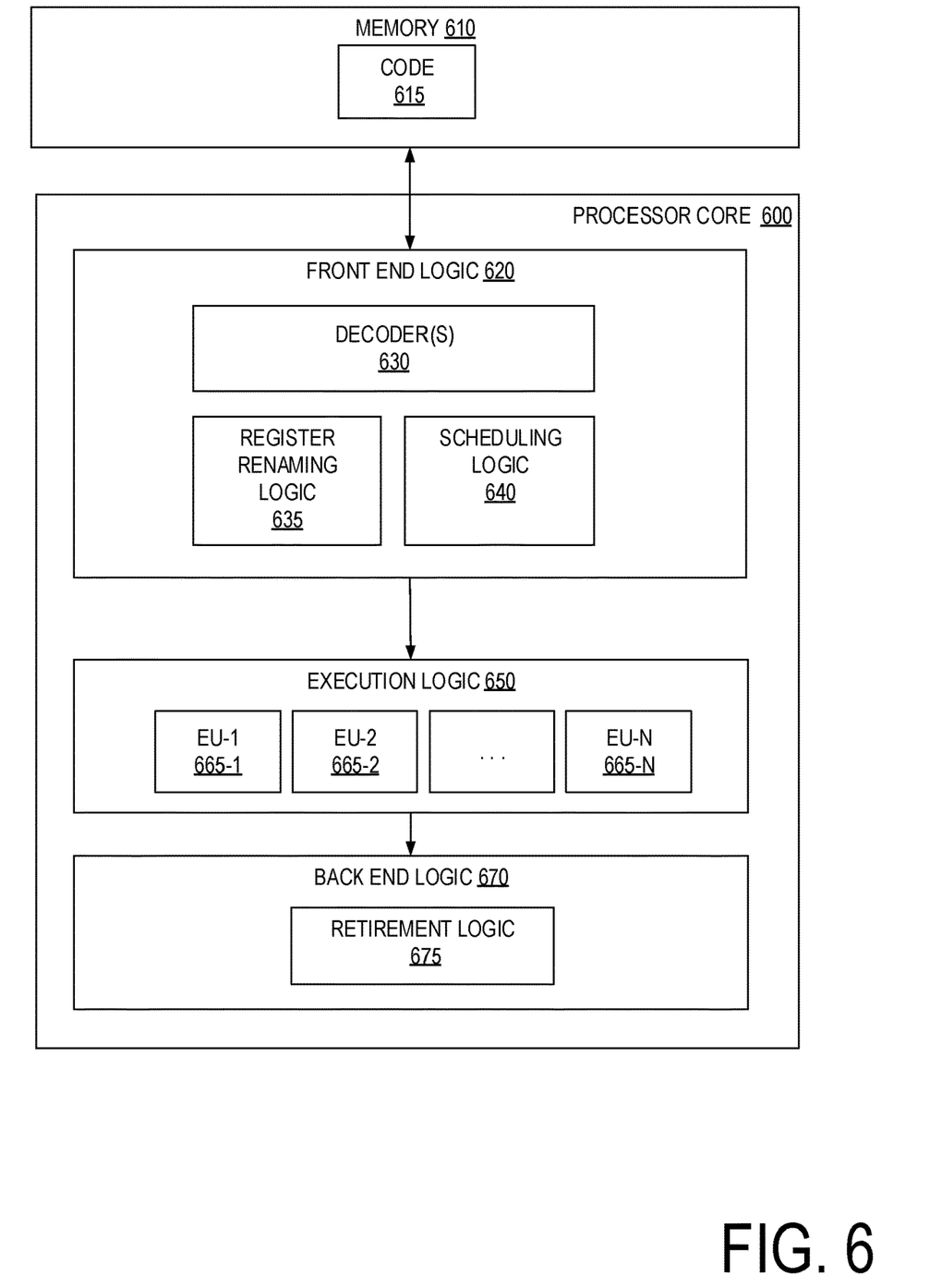
FIG. 6 is a block diagram of an exemplary processing unit to execute computer-executable instructions as part of implementing technologies described herein.

FIG. 6 is a block diagram of an exemplary processing unit 600 to execute computer-executable instructions as part of implementing technologies described herein. The processing unit 600 can be a processing unit for any type of processor, such as a microprocessor, an embedded processor, a digital signal processor (DSP) or a network processor. The processing unit 600 can be a single-threaded core or a multi-threaded core in that it may include more than one hardware thread context (or "logical processor") per processing unit.

FIG. 6 also illustrates a memory 610 coupled to the processing unit 600. The memory 610 can be any memory described herein or any other memory known to those of skill in the art. The memory 610 can store computer-executable instruction 615 (code) executable by the processing unit 600.

The processing unit comprises front-end logic 620 that receives instructions from the memory 610. An instruction can be processed by one or more decoders 630. The decoder 630 can generate as its output a micro operation such as a fixed width micro operation in a predefined format, or generate other instructions, microinstructions, or control signals, which reflect the original code instruction. The front-end logic 620 further comprises register renaming logic 635 and scheduling logic 640, which generally allocate resources and queues operations corresponding to converting an instruction for execution.

The processing unit 600 further comprises execution logic 650, which comprises one or more execution units (EUs) 665-1 through 665-N. Some processing unit embodiments can include a number of execution units dedicated to specific functions or sets of functions. Other embodiments can include only one execution unit or one execution unit that can perform a particular function. The execution logic 650 performs the operations specified by code instructions. After completion of execution of the operations specified by the code instructions, back-end logic 670 retires instructions using retirement logic 675. In some embodiments, the processing unit 600 allows out of order execution but requires in-order retirement of instructions. Retirement logic 675 can take a variety of forms as known to those of skill in the art (e.g., re-order buffers or the like).

The processing unit 600 is transformed during execution of instructions, at least in terms of the output generated by the decoder 630, hardware registers and tables utilized by the register renaming logic 635, and any registers (not shown) modified by the execution logic 650. Although not illustrated in FIG. 6, a processing unit can include other elements on an integrated chip with the processing unit 600. For example, a processing unit may include additional elements such as memory control logic, one or more graphics engines, I/O control logic and/or one or more caches.

As used in any embodiment herein, the term "module" refers to logic that may be implemented in a hardware component or device, software or firmware running on a processor, or a combination thereof, to perform one or more operations consistent with the present disclosure. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. As used in any embodiment herein, the term "circuitry" can comprise, for example, singly or in any combination, hard-wired circuitry, programmable circuitry such as computer processors comprising one or more individual instruction processing cores, state machine circuitry, and/or firmware that stores instructions executed by programmable circuitry. Modules described herein may, collectively or individually, be embodied as circuitry that forms a part of one or more devices. Thus, any of the modules can be implemented as circuitry. A computing system referred to as being programmed to perform a method can be programmed to perform the method via software, hardware, firmware or combinations thereof.

Any of the disclosed methods can be implemented as computer-executable instructions or a computer program product. Such instructions can cause a computer or one or more processor units capable of executing computer-executable instructions to perform any of the disclosed methods. Generally, as used herein, the term "computer" refers to any computing device or system described or mentioned herein, or any other computing device. Thus, the term "computer-executable instruction" refers to instructions that can be executed by any computing device described or mentioned herein, or any other computing device.

The computer-executable instructions or computer program products as well as any data created and used during implementation of the disclosed technologies can be stored on one or more tangible or non-transitory computer-readable storage media, such as optical media discs (e.g., DVDs, CDs), volatile memory components (e.g., DRAM, SRAM), or non-volatile memory components (e.g., flash memory, solid state drives, chalcogenide-based phase-change non-volatile memories). Computer-readable storage media can be contained in computer-readable storage devices such as solid-state drives, USB flash drives, and memory modules. Alternatively, the computer-executable instructions may be performed by specific hardware components that contain hardwired logic for performing all or a portion of disclosed methods, or by any combination of computer-readable storage media and hardware components.

The computer-executable instructions can be part of, for example, a dedicated software application or a software application that is accessed via a web browser or other software application (such as a remote computing application). Such software can be read and executed by, for example, a single computing device or in a network environment using one or more networked computers. Further, it is to be understood that the disclosed technology is not limited to any specific computer language or program. For instance, the disclosed technologies can be implemented by software written in C++, Java, Perl, Python, JavaScript, Adobe Flash, or any other suitable programming language. Likewise, the disclosed technologies are not limited to any particular computer or type of hardware.

Furthermore, any of the software-based embodiments (comprising, for example, computer-executable instructions for causing a computer to perform any of the disclosed methods) can be uploaded, downloaded or remotely accessed through a suitable communication means. Such suitable communication means include, for example, the Internet, the World Wide Web, an intranet, cable (including fiber optic cable), magnetic communications, electromagnetic communications (including RF, microwave, and infrared communications), electronic communications, or other such communication means.

As used in this application and in the examples, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrase "at least one of A, B or C" can mean A; B; C; A and B; A and C; B and C; or A, B and C. Moreover, as used in this application and in the claims, a list of items joined by the term "one or more of" can mean any combination of the listed terms. For example, the phrase "one or more of A, B and C" can mean A; B; C; A and B; A and C; B and C; or A, B, and C.

The disclosed methods, apparatuses and systems are not to be construed as limiting in any way. Instead, the present disclosure is directed toward all novel and nonobvious features and aspects of the various disclosed embodiments, alone and in various combinations and subcombinations with one another. The disclosed methods, apparatuses, and systems are not limited to any specific aspect or feature or combination thereof, nor do the disclosed embodiments require that any one or more specific advantages be present or problems be solved.

Theories of operation, scientific principles or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

Although the operations of some of the disclosed methods are described in a particular, sequential order for convenient presentation, it is to be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

The following examples pertain to additional embodiments of technologies disclosed herein.

Example 1 is a method comprising: receiving, by an operating system, a request from an application for a requested amount of a resource of a computing system, the operating system and the application operating on the computing system; and denying the request if granting the request would exceed a resource limit indicating a limit on an amount of the resource that can be utilized by the application, the denying comprising accessing a data structure storing information indicating the resource limit, the data structure visible to a user space and a kernel space of computing system.

Example 2 comprises the method of example 1, further comprising calling a resource access control module to determine whether granting the request would exceed the resource limit.

Example 3 comprises the method of example 2, wherein the operating system is Linux, the resource access control module is called via a Linux Security Module hook, and the resource access control module is an extended Berkeley Packet Form (eBPF) Linux Security Module (LSM) program.

Example 4 comprises the method of example 2 or 3, wherein the data structure further stores an application identifier associated with the application, the data structure associating the application identifier with the resource limit, the request comprising the application identifier, the calling the resource access control module comprising providing the application identifier to the resource access control module.

Example 5 comprises the method of any one of examples 1-4, wherein the data structure is an extended Berkeley Packet Format (eBPF) map.

Example 6 comprises the method of any one of examples 1-5, wherein the application is a container.

Example 7 comprises the method of any one of examples 1-6, wherein the application is a virtual machine.

Example 8 comprises the method of any one of examples 1-7, wherein the data structure further stores a current usage of the resource.

Example 9 comprises the method of example 8, the denying the request based on the current usage of the resource.

Example 10 comprises the method of example 8, further comprising granting the request if granting the request would not exceed the resource limit, the granting the request based on the current usage of the resource.

Example 11 comprises the method of example 10, the method further comprising updating the current usage of the resource in response to granting the request.

Example 12 comprises the method of any one of examples 1-11, wherein the resource is software guard extension (SGX) encrypted page cache (EPC) memory.

Example 13 is a method comprising: writing to a data structure visible to a user space and a kernel space of a computing system information indicating a resource limit indicating a limit on an amount of a resource of the computing system that can be utilized by an application executing on the computing system; providing, from the application to an operating system executing on the computing system, a request for an amount of the resource; and receiving, from the operating system, information indicating whether the request is to be granted or denied.

Example 14 comprises the method of example 13, wherein the information indicating the resource limit indicating the limit on the amount of the resource that the computing system that can be utilized by the application comprises an application identifier associated with the application, the providing the request comprising providing the application identifier to the operating system.

Example 15 comprises the method of example 13 or 14, wherein the data structure is an extended Berkeley Packet Format (eBPF) map.

Example 16 comprises the method of any one of example 13-15, wherein the application is a container.

Example 17 comprises the method of any one of example 13-16, wherein the application is a virtual machine.

Example 18 comprises the method of any one of examples 13-17, wherein the operating system is a Linux operating system and the request is provided in a form of a Linux ioctl call.

Example 19 comprises the method of any one of examples 13-18, wherein the resource is software guard extension (SGX) encrypted page cache (EPC) memory.

Example 20 comprises the method of any one of examples 13-19, wherein the writing is performed by the application.

Example 21 comprises the method of any one of examples 13-20, wherein the writing is performed by an application launcher.

Example 22 comprises the method of example 21, wherein the application launcher is a container runtime.

Example 23 comprises the method of example 21, wherein the application launcher is a hypervisor.

Example 24 is an apparatus, comprising: one or more processing units; and one or more non-transitory computer-readable storage media having stored thereon instructions that, when executed, cause the one or more processing units to perform any one of the methods of examples 1-23.

Example 25 is one or more computer-readable storage media storing computer-executable instructions to cause one or more processing units to perform any one of the methods of examples 1-23.

Example 26 is an apparatus comprising one or more means to perform any one of the methods of examples 1-23.

The invention claimed is:

1. A method comprising:
receiving, by an operating system, a request from an application for a requested amount of a resource of a computing system, the operating system and the application operating on the computing system, wherein the operating system is Linux;
calling an extended Berkeley Packet Form (eBPF) Linux Security Module (LSM) program via a LSM hook to determine whether granting the request would exceed a resource limit indicating a limit on an amount of the resource that can be utilized by the application; and
denying the request if granting the request would exceed the resource limit, the denying comprising accessing a data structure storing information indicating the resource limit, the data structure visible to a user space and a kernel space of computing system.

2. The method of claim 1, wherein the data structure further stores an application identifier associated with the application, the data structure associating the application identifier with the resource limit, the request comprising the application identifier, the calling the eBPF LSM program comprising providing the application identifier to the eBPF LSM program.

3. The method of claim 1, wherein the data structure is an extended Berkeley Packet Format (eBPF) map.

4. The method of claim 1, wherein the data structure further stores a current usage of the resource.

5. The method of claim 4, the denying the request based on the current usage of the resource.

6. The method of claim 4, further comprising granting the request if granting the request would not exceed the resource limit, the granting the request based on the current usage of the resource.

7. The method of claim 6, the method further comprising updating the current usage of the resource in response to granting the request.

8. The method of claim 1, wherein the resource is software guard extension (SGX) encrypted page cache (EPC) memory.

9. A method comprising:
   writing to a data structure visible to a user space and a kernel space of a computing system information indicating a resource limit indicating a limit on an amount of a resource of the computing system that can be utilized by an application executing on the computing system;
   providing, from the application to an operating system executing on the computing system, a request for an amount of the resource, wherein the operating system is Linux, wherein providing the request for the amount of the resource comprises calling an extended Berkeley Packet Form (eBPF) Linux Security Module (LSM) program via a LSM hook to determine whether granting the request would exceed the resource limit; and
   receiving, from the operating system, information indicating whether the request is to be granted or denied.

10. The method of claim 9, wherein the information indicating the resource limit indicating the limit on the amount of the resource that the computing system that can be utilized by the application comprises an application identifier associated with the application, the providing the request comprising providing the application identifier to the operating system.

11. The method of claim 10, wherein the application is a container.

12. The method of claim 10, wherein the application is a virtual machine.

13. The method of claim 9, wherein the data structure is an extended Berkeley Packet Format (eBPF) map.

14. The method of claim 9, wherein the resource is software guard extension (SGX) encrypted page cache (EPC) memory.

15. The method of claim 9, wherein the writing is performed by an application launcher.

16. One or more non-transitory computer-readable storage media storing computer-executable instructions to cause one or more processing units to:
   receive, by an operating system, a request from an application for a requested amount of a resource of a computing system, the operating system and the application operating on the computing system, wherein the operating system is Linux;
   call an extended Berkeley Packet Form (eBPF) Linux Security Module (LSM) program via a LSM hook to determine whether granting the request would exceed a resource limit indicating a limit on an amount of the resource that can be utilized by the application; and
   deny the request if granting the request would exceed the resource limit, the denying comprising accessing a data structure storing information indicating the resource limit, the data structure visible to a user space and a kernel space of computing system.

17. The one or more non-transitory computer-readable storage media of claim 16, wherein the data structure further stores an application identifier associated with the application, the data structure associating the application identifier with the resource limit, the request comprising the application identifier, the calling the eBPF LSM program comprising providing the application identifier to the eBPF LSM program.

18. The one or more non-transitory computer-readable storage media of claim 16, wherein the data structure is an extended Berkeley Packet Format (eBPF) map.

19. The one or more non-transitory computer-readable storage media of claim 16, the denying the request based on a current usage of the resource, the data structure further storing the current usage of the resource.

20. The one or more non-transitory computer-readable storage media of claim 16, the instructions to further cause the one or more processing units to grant the request would not exceed the resource limit, the granting the request based on a current usage of the resource.

21. The one or more non-transitory computer-readable storage media of claim 16, wherein the application is a container.

22. The one or more non-transitory computer-readable storage media of claim 16, wherein the application is a virtual machine.

23. One or more non-transitory computer-readable storage media storing computer-executable instructions to cause one or more processing units to:
   write to a data structure visible to a user space and a kernel space of a computing system information indicating a resource limit indicating a limit on an amount of a resource of the computing system that can be utilized by an application executing on the computing system;
   provide, from the application to an operating system executing on the computing system, a request for an amount of the resource, wherein the operating system is Linux, wherein to provide the request for the amount of the resource comprises calling an extended Berkeley Packet Form (eBPF) Linux Security Module (LSM) program via a LSM hook to determine whether granting the request would exceed the resource limit; and
   receive, from the operating system, information indicating whether the request is to be granted or denied.

24. The one or more non-transitory computer-readable storage media of claim 23, wherein the information indicating the resource limit indicating the limit on the amount of the resource that the computing system that can be utilized by the application comprises an application identifier associated with the application, the providing the request comprising providing the application identifier to the operating system.

25. The one or more non-transitory computer-readable storage media of claim 23, wherein the data structure is an extended Berkeley Packet Format (eBPF) map.

* * * * *